United States Patent
Torita

(10) Patent No.: US 7,552,784 B2
(45) Date of Patent: Jun. 30, 2009

(54) DIFFERENTIAL STEERING TYPE MOTORIZED VEHICLE

(75) Inventor: Hideki Torita, Yokohama (JP)

(73) Assignee: Kanto Auto Works, Ltd., Kanagawa-ken (JP)

( * ) Notice: Subject to any disclaimer, the term of this patent is extended or adjusted under 35 U.S.C. 154(b) by 258 days.

(21) Appl. No.: 11/810,163

(22) Filed: Jun. 5, 2007

(65) Prior Publication Data

US 2008/0006455 A1    Jan. 10, 2008

(30) Foreign Application Priority Data

Jul. 5, 2006    (JP) .............................. 2006-185250

(51) Int. Cl.
*B62D 3/00* (2006.01)

(52) U.S. Cl. ..................... 180/7.1; 180/24.07; 180/6.24

(58) Field of Classification Search .................. 180/7.1, 180/22, 24.06, 24.07, 6.24
See application file for complete search history.

(56) References Cited

U.S. PATENT DOCUMENTS

| | | | |
|---|---|---|---|
| 4,641,720 A * | 2/1987 | Young ........................ | 180/6.24 |
| 4,823,900 A * | 4/1989 | Farnam ....................... | 180/6.5 |
| 5,323,867 A * | 6/1994 | Griffin et al. ................. | 180/22 |
| 6,179,073 B1 * | 1/2001 | Chhabra et al. .............. | 180/9.1 |
| 7,213,855 B2 * | 5/2007 | Larson ........................ | 296/16 |

FOREIGN PATENT DOCUMENTS

| | | |
|---|---|---|
| JP | 47-12461 | 6/1972 |
| JP | 8-154301 | 6/1996 |
| JP | 9-294779 | 11/1997 |
| JP | 2001-104397 | 4/2001 |
| JP | 2002-137602 | 5/2002 |
| JP | 2005-47312 | 2/2005 |

* cited by examiner

*Primary Examiner*—Kevin Hurley
(74) *Attorney, Agent, or Firm*—Hoffmann & Baron, LLP

(57) ABSTRACT

A differential steering type motorized vehicle is capable of directly steering a front wheel by the turning operation of handlebars, and performing on-the-spot turning around a central position of a vehicle body together with differential rotation type control of drive wheels, and comprises the front wheel as one wheel supported by a lower end of a handlebar shaft provided below the handlebars and located at a central position along the lateral axis, rear wheels as a pair of right and left omnidirectional wheels, a pair of drive wheels which are located between the front wheel and the rear wheels, and drive-controlled so as to perform the differential steering caused by differences in rotational direction and rotational speed between the rear wheels, a rotational position sensor for detecting the turn direction and the turn angle from the reference position of the handlebars to be turned in the right or left direction, and a motor drive wheel control means for controlling the rotational direction and the rotational speed of motors attached to the pair of right and left drive wheels according to the turn angle.

4 Claims, 3 Drawing Sheets

$\theta = 0 \quad V_L = V_R$
$\theta < \theta_S \quad V_L < V_R$
$\theta = \theta_S \quad V_R = 0$
$\theta < \theta_S \quad V_L > \text{REVERSED } V_R$
$\theta = 90° \quad V_L = \text{REVERSED } V_R$

DIFFERENTIAL STEERING TYPE MOTORIZED VEHICLE

BACKGROUND OF THE INVENTION

1. Field of the Invention

The present invention relates to a differential steering type motorized vehicle having a pair of right and left drive wheels to be drive-controlled so as to perform differential steering according to the difference in the rotational direction and the rotational speed at a central position between a front wheel and rear wheels.

2. Description of the Related Art

As disclosed in Japanese Unexamined Patent Application Publication No. 8-154301 or the like, a motorized three-wheeler is known, which is used as a golf cart or a motorized three-wheeler for physically handicapped persons or aged persons with leg disabilities. In such a motorized three-wheeler, a front wheel located at a central position along the lateral axis direction can be steered directly by turning handlebars via a handlebar shaft, and right and left rear wheels are driven by a motor with a battery as a power supply.

As disclosed in Japanese Unexamined Patent Application Publication No. 47-12461, an omnidirectional movable vehicle is known, which is equipped with wheels having rotating bodies, i.e., rollers, arrayed around hubs, each of the rotating bodies having an axis of rotation inclined obliquely in the forward-advancing direction. Using these wheels, the vehicle is turnable on the spot by 360° and movable laterally using a differential steering type four-wheel drive. In addition, as disclosed in Japanese Unexamined Patent Application Publication No. 2002-137602, a nonturning omnidirectional wheel is known, which has a roller with a half-spindle shape, and as disclosed in Japanese Unexamined Patent Application Publication No. 2005-47312, a differential steering type omnidirectional movable vehicle is known, which is driven with the torque and rotational direction of four wheels being independent from each other by inclining the wheels having the rollers with the half-spindle shape symmetrically in the forward-advancing direction.

In Japanese Unexamined Patent Application Publication No. 9-294779, a four-wheel differential steering type wheelchair is disclosed, which is provided with a pair of right and left front wheels to be steered from a parallel state independently from each other to various kinds of non-parallel states, and a pair of right and left rear wheels to be motorized in a differential rotating manner independently from each other, and capable of performing on-the-spot turning by setting the front wheels in a V-shape, and rotating one rear wheel in the reverse direction at a same speed with respect to the other rear wheel in a private house, a hospital or the like.

On the other hand, as disclosed in Japanese Unexamined Patent Application Publication No. 2001-104397, a six-wheel differential steering type motorized wheelchair is known, which is provided with an elevating/lowering seat, a pair of right and left drive wheels to be controlled in a differential rotating manner at a central position in the longitudinal axis, a pair of right and left front wheels, and a pair of right and left rear wheels, and capable of performing standing work in a seated state by elevating the seat, and performing on-the-spot turning.

The motorized three-wheeler disclosed in the above-described Japanese Unexamined Patent Application Publication No. 8-154301 can be steered by handlebar operation of the front wheel, and the steering method therefor is familiar even to aged persons. However, the operation of directional change without any advancing, i.e., on-the-spot turning cannot be performed. The four-wheel drive differential steering type motorized vehicles disclosed in the above-described Japanese Unexamined Patent Application Publication No. 47-12461, and Japanese Unexamined Patent Application Publication No. 2005-47312 can perform spin-like on-the-spot turning around a central position of four wheels, i.e., around a part in a vicinity of the central position of a vehicle body. However, their driving mechanisms are expensive, and their steering method is based not on direct steering of the wheels, but on electronic control by an operation unit such as a joystick for generating a steering command signal, which is difficult for aged persons to use in comparison with that of the handlebar operation type; and a problem occurs, in that excessively large or small steering easily occurs unless the aged persons become sufficiently adept at steering. In the wheelchair capable of performing on-the-spot turning disclosed in the above-described Japanese Unexamined Patent Application Publication No. 9-294779, swing-like on-the-spot turning is performed around the central position between the right and left rear wheels in differential rotation, i.e., around a rear portion of the vehicle body as the center of rotation.

On the other hand, the six-wheel differential steering type motorized wheelchair disclosed in Japanese Unexamined Patent Application Publication No. 2001-104397 can perform spin-like on-the-spot turning around the central position of the right and left drive wheels in differential rotation, i.e., around the central position of the vehicle body. However, it is not assumed in this case that the front and rear wheels are of the nonturning type, and the wheelchair moving in the moving direction easily becomes unstable before the wheelchair follows the steering direction. In addition, in the steering of the wheelchair, the right and left drive wheels are subjected to differential rotation type control in response to the steering command signal to be output by the operation of the operation unit, and the wheels are not driven directly by the handlebar operation, resulting in problems of familiarity with the operational method or steering characteristics as described above.

SUMMARY OF THE INVENTION

Accordingly, in light of the above-described problems, it is an object of the present invention to provide a differential steering type motorized vehicle which is capable of being directly steered by turning a front wheel through the rotational operation of handlebars, and performing on-the-spot turning around a part in a vicinity of an central position of a vehicle body as a center of rotation together with differential rotation type control of drive wheels.

In order to achieve the above-described object, the differential steering type motorized vehicle of the present invention comprises one front wheel which is supported by a lower end of a handlebar shaft provided below handlebars and located at a central position, a pair of right and left rear wheels as omnidirectional wheels, a pair of drive wheels which are located between the front wheel and the rear wheels, and drive-controlled so as to perform the differential steering caused by differences in rotational direction and rotational speed between the rear wheels, a rotational position sensor for detecting a turn direction and the turn angle from the reference position of the handlebars to be turned in the right or left direction, and a motor drive wheel control means for driving motors respectively attached to the pair of right and left drive wheels by controlling the rotational direction and the rotational speed in response to the detection signal of the rotational position sensor so that the drive wheel on the handlebar turning direction side is successively decelerated, stopped, and accelerated in the reverse direction with respect to the drive wheel on the opposite side as the turn angle is increased, and rotates in the reverse direction at a same speed at the turn position of 90°.

When the front wheel is steered by the turning operation of the handlebars, the differences in rotational direction and rotational speed between the right and left drive wheels in response to the respective detection signals related to the turn direction and the turn angle, the differential steering along the turn direction of the handlebars by the drive wheels is simultaneously performed; and the rear wheels perform follow-up rotation in the steering direction since they are omnidirectional wheels. As the turning angle of the handlebars is increased, the rotational speed of the drive wheel on the turning side is gradually decreased, stopped and accelerated in the reverse direction; and when the handlebars are turned by 90°, the motorized vehicle performs spin-like rotational travel around the central position in the right or left direction of the pair of right and left drive wheels, i.e., around the central position of the vehicle body or a part in a vicinity thereof.

A five-wheel differential steering type motorized vehicle of the mechanical-electronic hybrid steering control type is realized, in which the front wheel is directly steered by the operation of the handlebars, and at the same time, the pair of right and left drive wheels at the central position along the longitudinal axis are drive-controlled in a differential rotational manner. Thus, on-the-spot turning can be performed around a central portion of the vehicle body; the steering by the operation of the handlebars which is familiar to aged persons than that of a differential steering type motorized vehicle having an operation unit for outputting a steering command signal can be performed; excessively large or small steering is less likely to occur because the vehicle can be steered while maintaining regular steering characteristics; and continuous travel less affected by the movement of the center of gravity when the vehicle travels on a slope can be guaranteed since the drive wheels are located at the center along the longitudinal axis.

In order to smoothly perform the follow-up rotation of the rear wheels in the steering direction, the rear wheels as the omnidirectional wheels are of the nonturning type in which a plurality of rollers rotating in the direction orthogonal to the forward-advancing direction of the wheels are arrayed around the hubs. Thus, the smooth follow-up in the steering direction can be performed by the curved advancement of the nonturning omnidirectional wheels associated with the rotation of the rollers in comparison with the arrangement of casters in place of the rear wheels. In a favorable configuration of the omnidirectional wheels, each roller has a half-spindle shape in which the diameter thereof is continuously decreased from a base end to a fore end thereof, and the fore end of each roller partially enters a recess formed in the base end of an adjacent roller so as to be brought close to the base end of the adjacent roller. Thus, the outer circumference of the omnidirectional wheels having the rollers decreases the space between the rollers, and realizes a circular shape to prevent pebbles or the like from being caught in the spaces between the rollers of the rear wheels even when the vehicle performs outdoor travel, to suppress any play caused by the existence of such a space, and to smoothly perform the forward advancement or sideways advancement. In order to perform the four-wheel drive with a simple configuration under the assumption of nonturning, the pair of rear wheels are connected to the drive wheels on the right and left sides via belts. Thus, the vehicle can smoothly travel on a road surface with a slope or steps, and a road surface of an uneven road, resulting in high running through performance and high steering stability.

DETAILED DESCRIPTION OF THE PREFERRED EMBODIMENTS

A differential steering type motorized vehicle according to embodiments of the present invention with reference to FIGS. 1 to 5. The motorized vehicle is constituted of a five-wheel type motorized wheelchair having one front wheel 1 consisting of a rubber tire arranged at an central position along the lateral axis, a pair of right and left nonturning and omnidirectional rear wheels 3L and 3R in which a plurality of rollers 3a rotating in the direction orthogonal to the wheel forward-advancing direction are arrayed around the wheels to enable turning, and a pair of right and left drive wheels 2L and 2R consisting of a rubber tire which are located between the front wheel and the rear wheels, provided with a reduction gear 10a, the speed and the rotational direction of each wheel being independently controlled and the wheels being driven by drive units 10L and 10R with a motor built therein.

Figure 1:
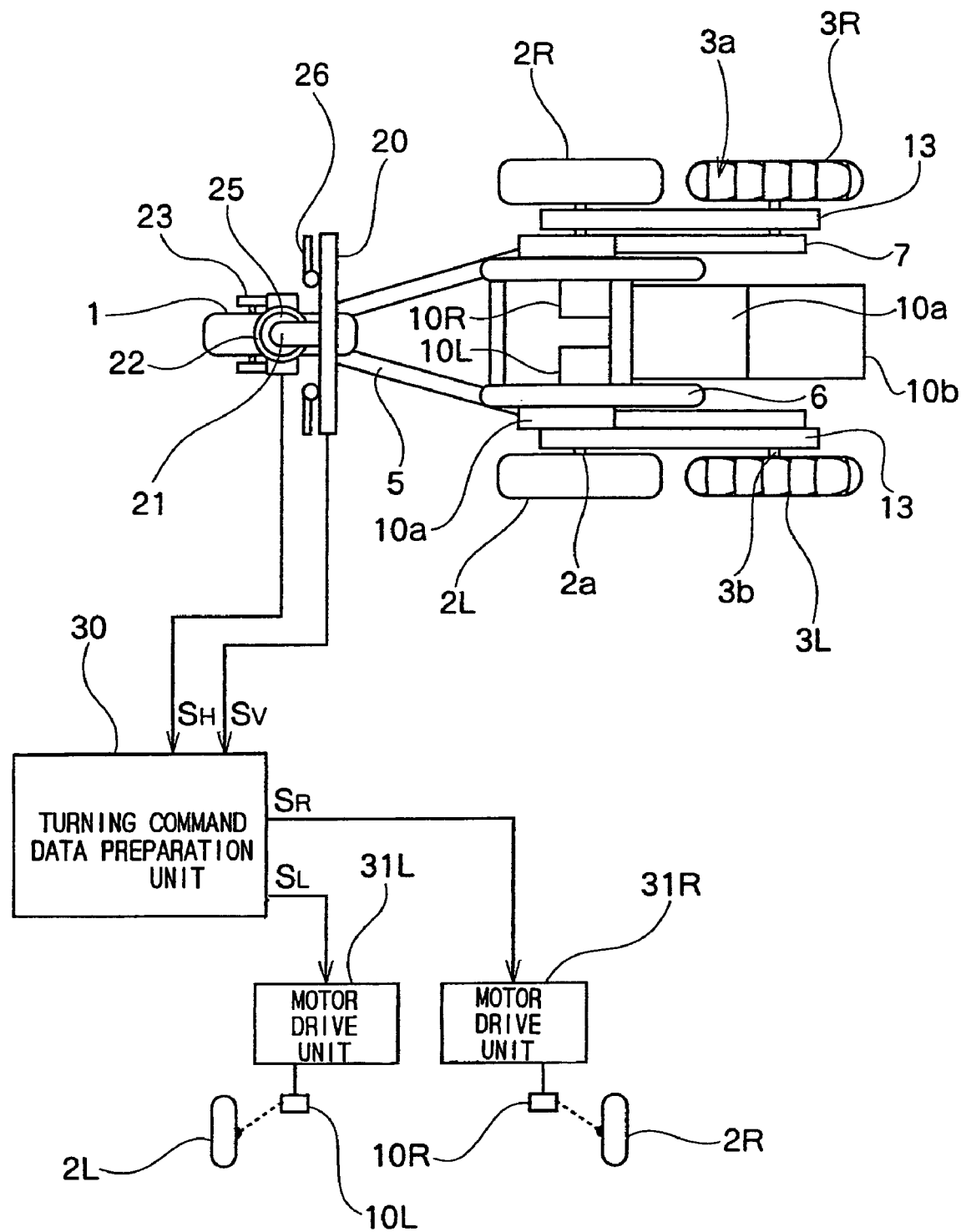
FIG. 1 is a plan view of a differential steering type motorized vehicle according to an embodiment of the present invention with a cover thereof detached.
Figure 2:
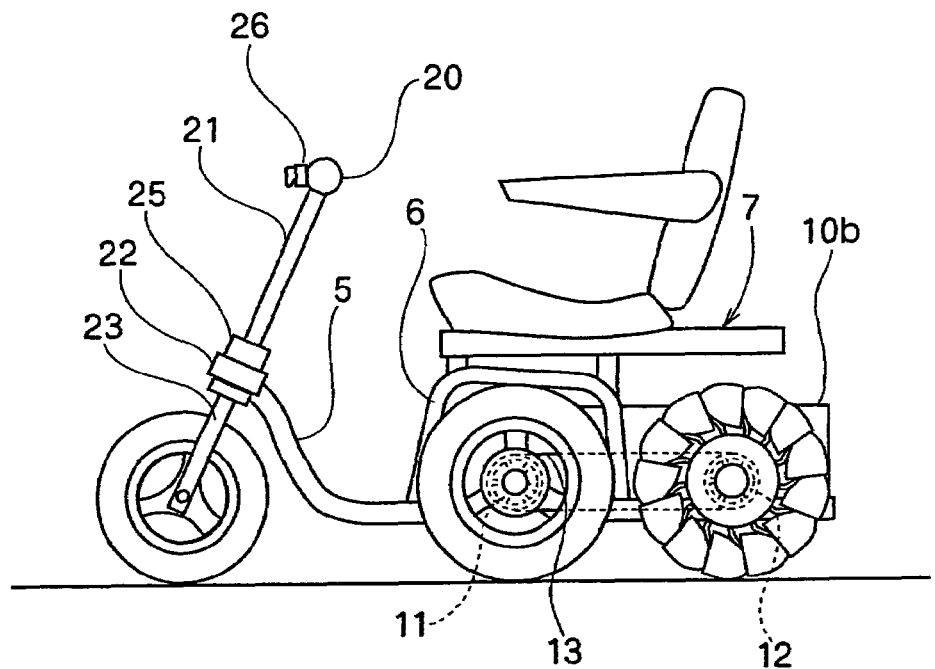
FIG. 2 is a side view of the differential steering type motorized vehicle with the cover thereof detached.
Figure 3:
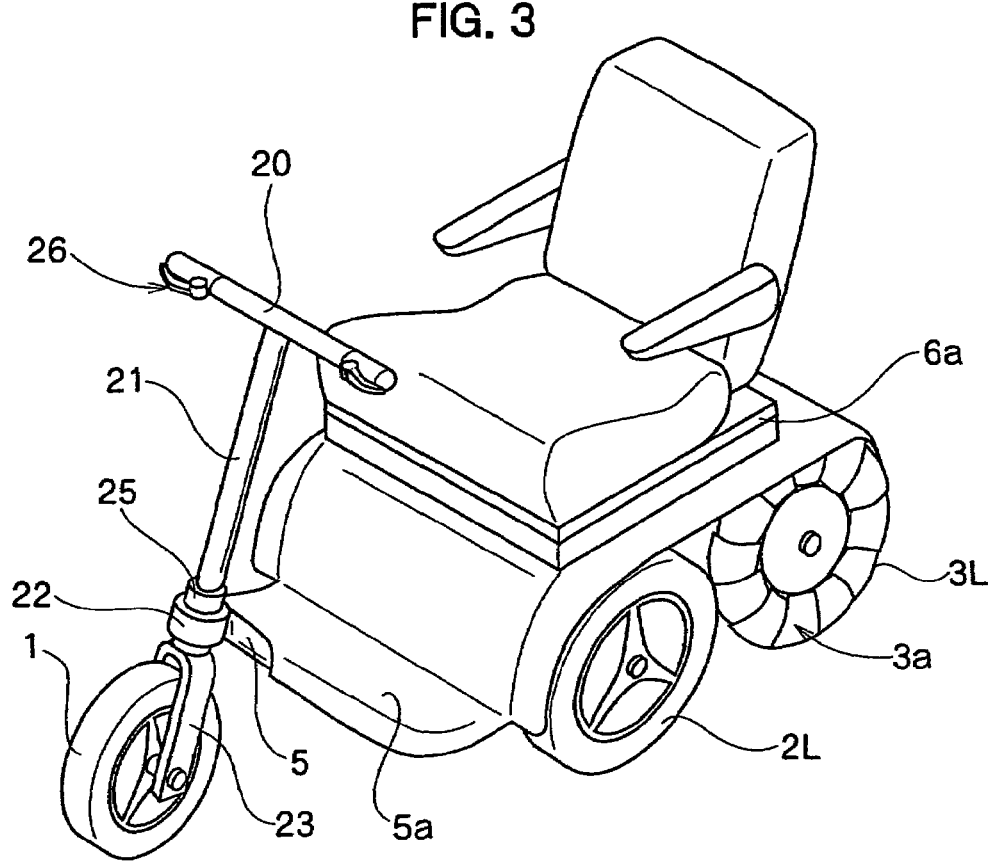
FIG. 3 is a perspective view of the motorized vehicle.

The drive wheels 2L and 2R, and the rear wheels 3L and 3R are respectively mounted on a tubular lower frame 5 constituting a vehicle body frame via axles 2a and 3b so that the tread of the drive wheels 2L and 2R is the same as that of the rear wheels 3L and 3R. Further, a toothed belt 13 is wound between a tooth pulley 11 mounted on the axles 2a of the drive wheels 2L and 2R and a tooth pulley 12 mounted on the axles 3a of the rear wheels 3L and 3R, and the rear wheels 3L and 3R are connected to the drive wheels 2L and 2R via the belt. A battery 10b forming a power supply of the motor is also mounted on the lower frame 5, and a cover 5a is attached to the lower frame as shown in FIG. 3. Further, a seating part is arranged on upper frames 6 and 7, and a cover 6a is attached to a vicinity thereof.

The rear wheels 3L and 3R have a diameter capable of easily riding over a step between a sidewalk and a driveway, each roller 3a is arrayed on a rim around the axle 3b, and formed in a half-spindle shape in which the diameter of a proximal end is smaller than the diameter of a base end so as to form an arc of a circumscribing circle of the rear wheels 3L and 3R out of the circumferential surface, and the proximal end partially enters a recess formed in the base end so as to be brought close to the adjacent base ends. The outside diameter of the rear wheels 3L and 3R is the same as the outside diameter of the drive wheels 2L and 2R, and the rear wheels perform interlocking travel at a same velocity through the tooth pulleys 11 and 12 having the same outside diameter.

A steering column 22 for turnably supporting a handlebar shaft 21 provided below the central position of handlebars 20 extending along the lateral axis in a lever shape is mounted on a proximal end at a central position along the lateral axis where the lower frame 5 is raised. In the steering column, a front wheel supporting fork 23 extending downwardly to support the front wheel 1 is connected to a lower end of the handlebar shaft 21. A pair of right and left throttle levers 26 having the same function are mounted on the handlebars 20.

A potentiometer 25 as a rotational position sensor, which detects the turn direction and the turn angle from the reference position of the handlebar shaft 21 to be interlockingly turned with the turning operation of the handlebars 20 and outputs the turn signal $S_H$, is placed on the steering column 22.

In addition, a circuit device comprising a turning command data preparation unit 30 which prepares the turning command data for the differential steering of rotating the drive wheels 2L and 2R in the forward and reverse directions at the variable speeds independent from each other through the computation with the turn signal $S_H$ and the speed signal $S_V$ of one operational quantity or the larger one of both operational quantities of the right and left throttle levers 26 forming the input signal, and outputs the turning command signal $S_L$ for instructing the rotational direction and the rotational speed of the drive wheels 2L and the turning command signal $S_R$ of the drive wheel 2R, and a motor drive control means consisting of motor drive units 31L and 31R for respectively driving the drive units 10L and 10R in response to these steering signals is mounted on a vehicle body frame.

The turning command data preparation unit 30 outputs the turning command signals $S_L$ and $S_R$ so that the differential steering is performed in a hybrid manner between the operation of the handlebars and the electronic steering control in response to the turning operation of the handlebars 20 in a range of 90° in the right or left direction. For example, when the handlebars 20 are turned to the right, the turning command data preparation unit outputs the turning command signals $S_L$ and $S_R$ for allowing the drive wheel 2L to travel at the speed $V_L$ and the drive wheel 2R to travel at the speed $V_R$, respectively.

$$V_R = V_C \times r_R / r$$

$$V_L = V_C \times r_L / r$$

Figure 4:
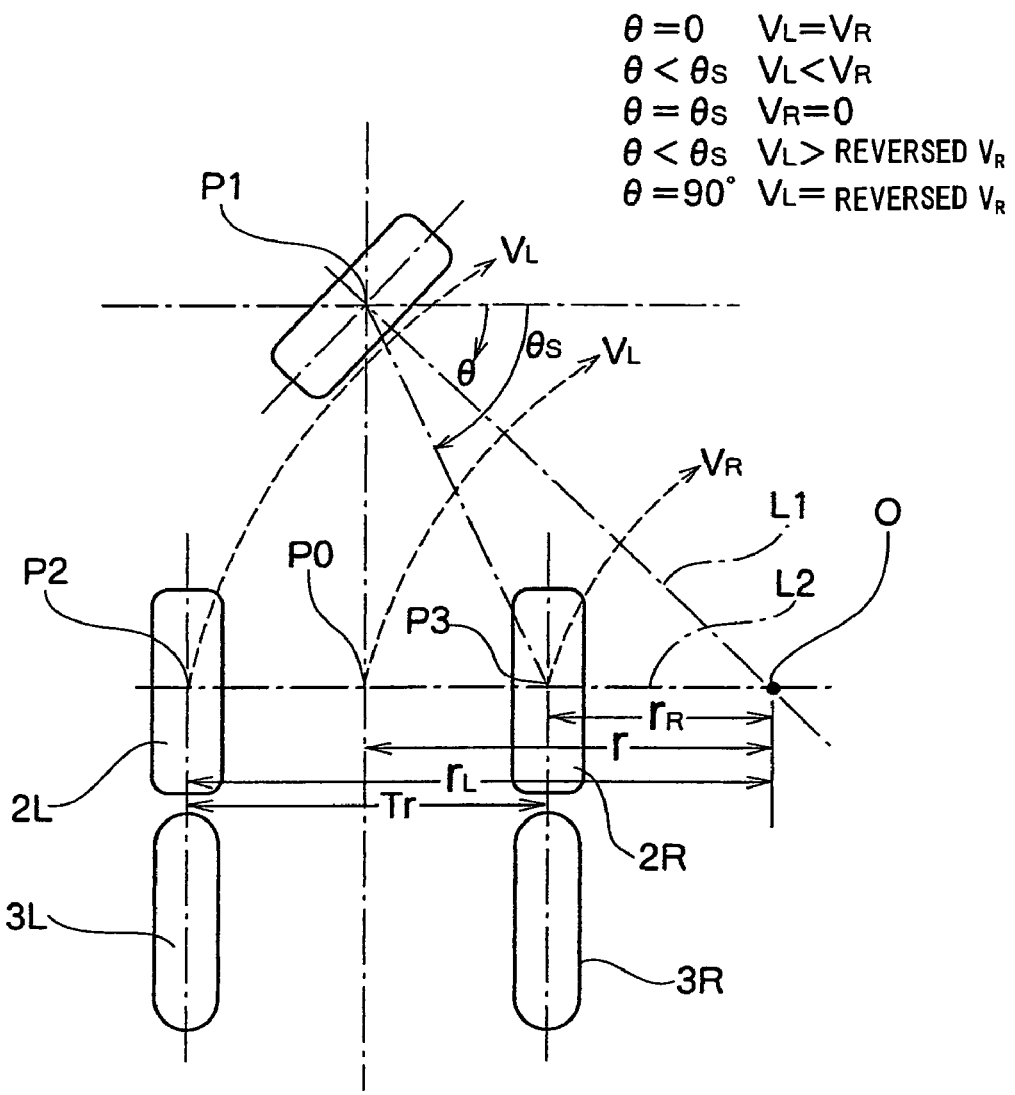
FIG. 4 is a view for explaining the steering principle of the motorized vehicle by operating handlebars.

Here, as shown in FIG. 4, $V_C$ denotes the speed at the central position $P_o$ between the drive wheels 2L and 2R, $T_r$ denotes a tread, $r_R = r - T_r/2$ and $r_L = r + T_r/2$, and r denotes the distance between the turning center position O and the intermediate position $P_o$, the turning center position O being a point at which the operational reference line L1 and the axle line L2 intersect, the operational reference line L1 being a line that laterally intersects the steering rotational axis P1 extending in the vertical direction of the front wheel 1 when the front wheel 1 is advancing forward, the axle line L2 being a line that connects the center position P2 of the left drive wheel 2L and the center position P3 of the right drive wheel 2R.

Figure 5:
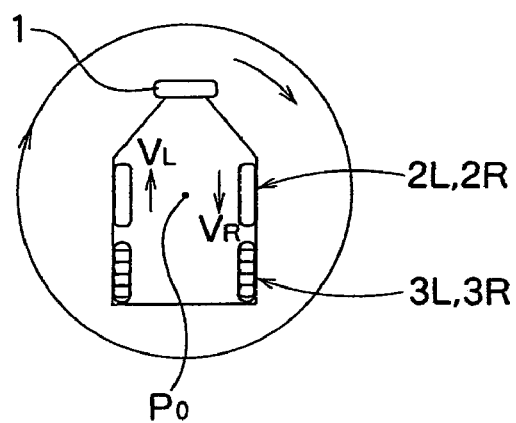
FIG. 5 is a view for explaining the on-the-spot turning operation of the motorized vehicle.

Therefore, when the handlebars 20 are turned to the right from the operational reference position in the forward-advancing direction, the speed $V_R$ is gradually and relatively reduced from the same speed with respect to the speed $V_L$ in the range ($r > T_r/2$) of the turn angle θ where the turning central position O occupies the outside of the tread. When the turn angle θ reaches the turn angle $θ_s$ ($r - T_r/2 = 0$) where the operational reference line L1 overlaps the central position P3 of the drive wheel 2R, in other words, the tread, the drive wheel 2R is stopped. In addition, when the turn angle θ is increased toward 90° ($r < T_r/2$, and $r - T_r/2 < 0$), the drive wheel 2R is rotated in the reverse direction and gradually accelerated. In other words, as the turn angle θ is increased, the speed $V_R$ is relatively decreased, the wheel stopped, and the rotational direction is reversed and the speed $V_R$ relatively increased so that the drive wheel 2R is subjected to the differential control along the steering direction of the front wheel 1, and as shown in FIG. 5, at the turn angle of 90° the drive wheels are rotated at the same speed in the reversed rotational direction to travel around the central position $P_o$.

When the handlebars 20 are turned to the left, the above-described principles are reversed, and the differential steering to the left side is performed opposite to that described above for turning to the right side. Further, when an operation unit such as a lever for the reverse drive is attached, the differential steering is performed with the drive wheels 2L and 2R being driven in a reverse direction while maintaining the above-described relationship in response to the reverse drive signal. The handlebars can have various shapes such as a circular wheel shape and an elliptical wheel shape in place of the above-described lever shape which is symmetrical in the right-to-left direction.

The operation of the five-wheel differential steering type motorized vehicle of this configuration is as follows. The traveling speed is adjusted by the operation of the throttle lever 26, and the rear wheels 3L and 3R are interlockingly rotated with the drive wheels 2L and 2R on the respective sides to allow the vehicle to travel as a four-wheel drive type vehicle. The vehicle can stably travel even on irregular ground, smoothly pass irregularities and steps, and reach a high running through performance and has high steering stability. Even when the center of gravity of the vehicle body is moved backward or forward uphill or downhill, the drive wheels 2L and 2R easily maintain the contact with the ground at the central position in the longitudinal direction, resulting in stable travel. Overturning on a complicated irregular road can be reliably prevented due to the presence of the right and left rear wheels 3L and 3R.

When the handlebars 20 are turned from the operational reference position in the forward-advancing direction, the rotational direction and the rotational speed of the drive wheels 2L and 2R are controlled so as to follow the direction, and the drive wheels are rotated in the differential steering state. Under this condition, the rollers 3a of the rear wheels 3L and 3R are rotated in the omnidirectional manner according to the vector component in the lateral direction of the driving force, and turned in the operational direction of the handlebars 20. In this turn, the tread of the rear wheels 3L and 3R is the same as that of the drive wheels 2L and 2R, and any power loss or noise attributable to the deviation of the turning radius does not occur in principle. Further, the rear wheels 3L and 3R are nonturning omnidirectional wheels having rollers, and therefore smoothly perform the follow-up travel in the steering direction. In addition, since the rollers 3a tightly form the circular outer circumference of the wheels, any play is eliminated, and the likelihood of pebbles or the like being caught in a space between the rollers 3a outdoors can be suppressed to ensure stable travel.

When the handlebars 20 are turned to the 90° position, the drive wheels 2L and 2R are rotated at a same speed in directions opposite to each other around the central position, i.e., the substantially central position of the vehicle body on a circle with the distance to the central position as the radius thereof, and perform the on-the-spot turning in a spin manner. In this condition, the front wheel 1 travels along the tangential direction of the spin turning circle, and the floor surface is not damaged by the abrasion with the drive wheels 2L and 2R subjected to the differential steering, and the rear wheels 3L and 3R smoothly perform the circular travel by the rotation of the rollers 3a.

According to another embodiment, in order to simplify the configuration, a connection belt to be interlocked with the drive wheels is omitted, and the rear wheels 3L and 3R can perform the independent follow-up rotation in a nonturning and omnidirectional manner in the steering direction by the rotation of the rollers 3a. In this condition, if any slight instability of the follow-up travel is accepted, the rear wheels may be casters of turning omnidirectional wheels. In addition, the four-wheel drive can be performed by omitting a connection belt, providing a drive unit with a motor built therein independently from the rear wheels 3L and 3R, and realizing the same traveling speed as that of the drive wheels.

What is claimed is:

1. A differential steering type motorized vehicle comprising a pair of right and left drive wheels which are located at an central position between a front wheel and rear wheels, and drive-controlled so as to perform differential steering caused by differences in rotational direction and rotational speed between the drive wheels, wherein the rear wheels are a pair of right and left omnidirectional wheels, and the front wheel is one wheel which is supported by a lower end of a handlebar shaft provided below handlebars and located at a central position in the lateral axis direction, and further comprising:

a rotational position sensor for detecting a turn direction and a turn angle from the reference position of the handlebars to be turned in the right or left direction; and a motor drive wheel control means for driving motors attached to the pair of right and left drive wheels by controlling the rotational direction and the rotational speed in response to a detection signal of the rotational position sensor so that the drive wheel on the handlebar turning direction side is successively decelerated, stopped, and accelerated in the reverse direction with respect to the drive wheel on the opposite side as the turn angle is increased, and rotates in the reverse direction at a same speed to each other at a turn position of 90°.

2. The differential steering type motorized vehicle according to claim 1, wherein the omnidirectional rear wheels are of a nonturning type in which a plurality of rollers rotatable in a direction orthogonal to a forward-advancing direction of the wheels are arrayed around the wheels.

3. The differential steering type motorized vehicle according to claim 2, wherein each roller has a half-spindle shape in which the diameter thereof continuously decreases from a base end to a fore end thereof, and the fore end of each roller partially extends into a recess formed in the base end of an adjacent roller so that the fore end is brought close to the base end of the adjacent roller.

4. The differential steering type motorized vehicle according to claim 2, wherein the pair of right and left rear wheels are connected respectively to the right and left drive wheels via belts.

* * * * *